(12) United States Patent
Goossens et al.

(10) Patent No.: US 6,318,703 B1
(45) Date of Patent: Nov. 20, 2001

(54) ELECTROMAGNETIC VALVE AND PROCESS FOR SETTING THE STROKE OF AN ELECTROMAGNETIC VALVE

(75) Inventors: Andre F. L. Goossens, Rumst; Antoine Rottiers, Londerzeel, both of (BE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/341,619

(22) PCT Filed: Dec. 22, 1997

(86) PCT No.: PCT/EP97/07240

§ 371 Date: Oct. 8, 1999

§ 102(e) Date: Oct. 8, 1999

(87) PCT Pub. No.: WO98/31578

PCT Pub. Date: Jul. 23, 1998

(30) Foreign Application Priority Data

Jan. 14, 1997 (DE) .............................. 197 00 980

(51) Int. Cl.⁷ .................................................. F16K 31/06
(52) U.S. Cl. ....................... 251/129.15; 335/281
(58) Field of Search ...................... 251/129.15; 335/281

(56) References Cited

U.S. PATENT DOCUMENTS

| | | | |
|---|---|---|---|
| 5,333,836 | * | 8/1994 | Fukuyo et al. ................... 251/129.15 |
| 5,476,313 | * | 12/1995 | Lauer ........................ 251/129.15 X |
| 5,511,864 | * | 4/1996 | Reinartz et al. ................... 303/119.2 |
| 5,564,676 | * | 10/1996 | Goloff et al. ..................... 251/129.15 |
| 5,577,322 | * | 11/1996 | Ohshita et al. ............. 251/129.15 X |
| 5,603,483 | * | 2/1997 | Reuter et al. ............... 251/129.15 X |
| 5,626,326 | * | 5/1997 | Goossens et al. ................. 251/129.15 |
| 5,704,587 | * | 1/1998 | Kuromitsu et al. ............. 251/129.15 |
| 5,895,026 | * | 4/1999 | Linkner, Jr. et al. ........... 251/129.15 |
| 6,003,838 | * | 12/1999 | Beck ............................... 251/129.15 |

* cited by examiner

Primary Examiner—Kevin Shaver
Assistant Examiner—John Bastianelli
(74) Attorney, Agent, or Firm—Rader, Fishman & Grauer PLLC

(57) ABSTRACT

The present invention relates to an electromagnetic valve which includes a valve housing with a valve seat member and a valve closure member controlled by a magnet armature, a valve coil arranged close to the magnet armature and delimited by a yoke ring, and a housing portion which closes the valve housing and on which the magnet armature is supported. The valve housing, the housing portion closing the valve housing, the yoke ring and the magnet armature are made of a magnetic-flux conductive material, and the magnetic circuit between the yoke ring and the valve housing is closed by way of a ferromagnetic annular piece fitted to the valve housing and/or by way of a ferromagnetic accommodating member which carries the valve housing.

8 Claims, 2 Drawing Sheets

ELECTROMAGNETIC VALVE AND PROCESS FOR SETTING THE STROKE OF AN ELECTROMAGNETIC VALVE

The present invention relates to an electromagnetic valve according to the preamble of patent claim 1.

German patent application No. 40 30 571 discloses an electromagnetic valve which, in its electromagnetically non-energized closed initial position, isolates a pressure fluid passage by way of a valve tappet which abuts on a valve seat in the valve housing. In the electromagnetically energized position of the valve, the magnetic circuit via the yoke ring which largely encloses the coil, via the sleeve member, the magnetic core inserted in the sleeve member, the magnet armature abutting on the magnetic core, the annular piece and the valve housing is closed. The sleeve member is made of a non-magnetic material to prevent a short circuit of the magnetic circuit between the yoke ring and the valve housing. However, the disadvantage is that due to the non-magnetic sleeve member, the magnetic flux is weakened as a result of the magnetic resistance which has to be bridged. Therefore, the construction provides a yoke ring which is deepdrawn relatively far into the interior of the coil in order to counteract this weakening of the magnetic field.

German patent application No. 41 41 546 describes an electromagnetic valve which exhibits a pressure fluid passage between the valve closure member and the valve seat in its electromagnetically non-energized initial position. In this valve, the magnetic circuit of the valve coil is closed by way of the yoke ring, the sleeve member, the magnet armature, the annular piece acting as a magnetic core and the valve housing when the valve coil is energized electromagnetically. To prevent shortcircuiting of the magnetic flux via the yoke ring, the sleeve member and the magnetic core, which would prevent actuation of the magnet armature, the sleeve member is equally made of a magnetically non-conductive material, as mentioned hereinabove with respect to the cited state of the art. The result of the non-magnetic sleeve member is a magnetic resistance which impairs the magnetic flux from the yoke ring to the magnet armature.

An object of the present invention is to improve upon an electromagnetic valve of prior art types of construction to such effect as to achieve, by simple and low-cost provisions, an operationally reliable electromagnetic valve which exhibits a minimum possible weakening of the magnetic circuit between the sleeve member and yoke ring and lends itself to miniaturization.

According to the present invention, this object is achieved in an electromagnetic valve of the generic type by the characterizing features of patent claim 1. Further, patent claims 11 and 12 disclose appropriate methods of the stroke adjustment of a magnet armature in a valve housing which are also suited for use in an electromagnetic valve of the generic type.

Further features and advantages of the present invention can be seen in the following in the subclaims and two embodiments which will be explained hereinbelow by making reference to the accompanying drawings.

Figure 1:
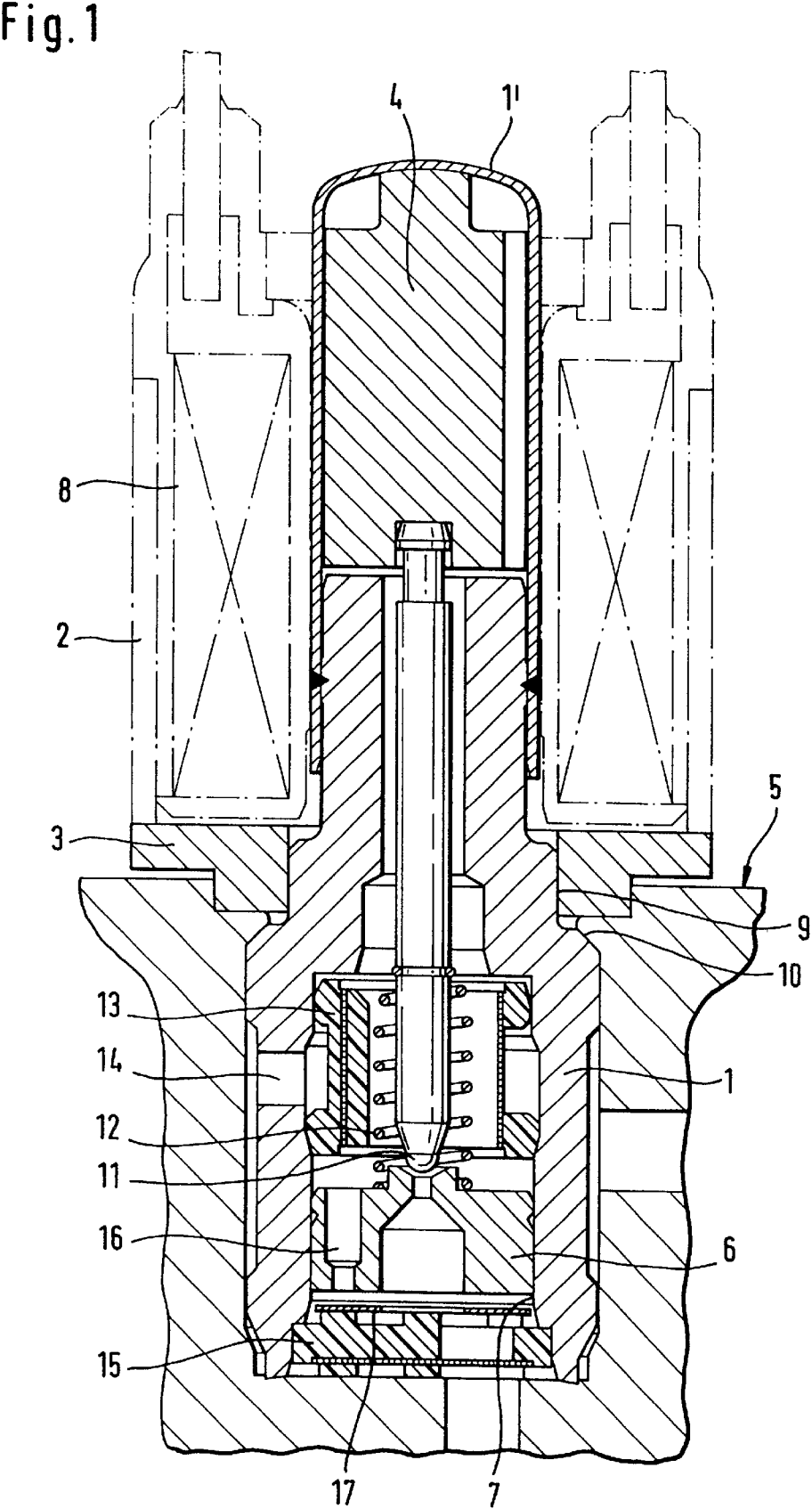
FIG. 1 is an open electromagnetic valve which is not energized electromagnetically in its inactive position.

FIG. 1 shows an enlarged view of the structural details of an electromagnetic valve which is not energized electromagnetically in its inactive position and adopts its open position. The valve housing 1 is made in a cartridge-type construction and fitted in an extremely simple accommodating bore of an accommodation member (valve block) 5 by means of caulking or shearing attachment. In an expedient manner, the valve housing 1 is attached in the accommodating member 5 by means of an annular piece 3 which is slipped from outwards on the valve housing 1. Annular piece 3 has a step for the purpose of displacing material volume of the accommodating member 5 in the direction of a chamfer 10 of the valve housing 1. Naturally, the accommodating member 5 is made of a material softer than that of the electromagnetic valve so that the annular piece 3 which is guided on a stepped portion 9 of the valve housing 1 is able to displace the material volume of the accommodating member 5, which is preferably composed of a light metal alloy, in the direction of the stepped portion 9 and, thus, onto the chamfer 10 of the valve housing 1. However, it is also possible to use the disclosed electromagnetic valve for an accommodating member 5 made of steel. This eliminates the need for the annular piece 3 both with respect to the caulking operation and as regards its use as a portion of a magnetic circuit. The yoke ring 2 according to the drawing would then bear directly against the outside surface of the accommodating member 5 in order to establish by it a magnetic circuit connection to the valve housing 1.

It follows automatically from the previous explanations that the valve housing 1, the dome-shaped housing portion 1' that closes the valve housing 1, the yoke ring 2, and the magnet armature 4 are made of a magnetic-flux conducting material, and the magnetic circuit between the yoke ring 2 and the valve housing 1 can be constituted either by way of the ferromagnetic annular piece 3 fitted to the valve housing 1 and/or by way of a ferromagnetic accommodating member 5 which carries the valve housing 1.

When scrutinizing the FIG. 1 embodiment it shows that the valve housing 1 has an opening 7 at the end surface remote from the sleeve-shaped housing portion 1' which is adapted in its diameter to the valve seat member. The valve seat member 6 is inserted without clearance into opening 7. The depth of the opening 7 which is conformed to the nominal diameter of the valve seat member 6, in any case, is chosen to be larger than the size of the valve seat member 6 in order that adjustment of the valve seat member 6 in the opening 7 can be ensured when desired. In the area of the bore of the accommodating member 5, the valve housing 1 has the contour of a hollow-cylindrical turned part which is opened in the direction of the accommodating member 5 and adjacent to which is a cylindrical extension which is decreased in its outside diameter and extends until into the valve coil 8 to form the closed sleeve-shaped housing portion 1'. According to the present invention, the sleeve-shaped housing portion 1' is made of a ferromagnetic material. The sleeve-shaped housing portion 1' is closed like a dome and preferably deepdrawn from stainless steel. The housing portion 1' can be attached pressure-fluid-tightly to the extension of the valve housing 1 both in a welded or hard-soldered connection. Between the housing portion 1' and the valve housing 1, the above-mentioned stepped portion 9 is provided with an adjacent chamfer 10 on which the annular piece 3, after the pressing operation, is maintained in an operative engagement in a relatively small step in the accommodating member 5.

The magnet armature 4 which is movably disposed within the sleeve-shaped housing portion 1' is in abutment in the dome-shaped end area of the housing portion 1', and the spherical valve closure member 11 shaped on a tappet simultaneously remains in its electromagnetically non-energized open switch position. relative to the valve seat member 6. For the above-mentioned initial position, a compression spring 12 is attached to the tappet-shaped portion of the valve closure member 11. With its one end, spring 12 is supported on the valve seat member 6 and urges the tappet against the magnet armature 4.

The resulting magnet armature stroke for the purpose of the closing operation during electromagnetic energization is consequently determined by the position of the sleeve-shaped housing portion 1' on the extension of the valve housing 1. An expedient method of stroke adjustment of the magnet armature 4 therefore provides that the magnet armature 4, by the effect of the compression spring 12, is initially moved to abut with its end surface remote from the valve closure member 11 in the dome area of the housing portion 1'. Subsequently, the sleeve-shaped housing portion 1' is displaced on the extension of the valve housing 1 in the direction of the valve closure member 11 until a pressure fluid volume which, subjected to low pressure, propagates through the open valve seat member 6 achieves a rate of volume flow representative of the desired stroke adjustment of the magnet armature 4. Thereafter, the sleeve-shaped housing portion 1' is fixed in the corresponding position on the extension in operative engagement therewith. This is preferably effected by way of electron beam welding.

In addition to the above-mentioned details, further details of the FIG. 1 embodiment will be referred to in the following. More specifically, these details concern the arrangement of an annular filter 13 upstream of the valve seat member 6 in the mid-portion of the opening 7 of the valve housing 1 at the level of a transverse channel 14 which conducts pressure fluid. Further, a plate filter 15 inserted into the opening 7 is arranged downstream of the valve seat member 6. A plate-type non-return valve 17 is interposed between the plate filter 15 and a bypass channel 16 which extends through the valve seat member 6. Also, it can be seen in the drawing that the end area of the valve housing 1 which abuts in the accommodating member 5 is chamfered like a cutting edge so that the cutting edge portion is urged into the bore bottom of the accommodating member 5 by way of the annular piece 3 in the pressing operation of the valve housing 1 in order to achieve a good sealing effect, and thereby generates the counteracting force which is required for the caulking operation in the area of the annular piece 3.

Figure 2:
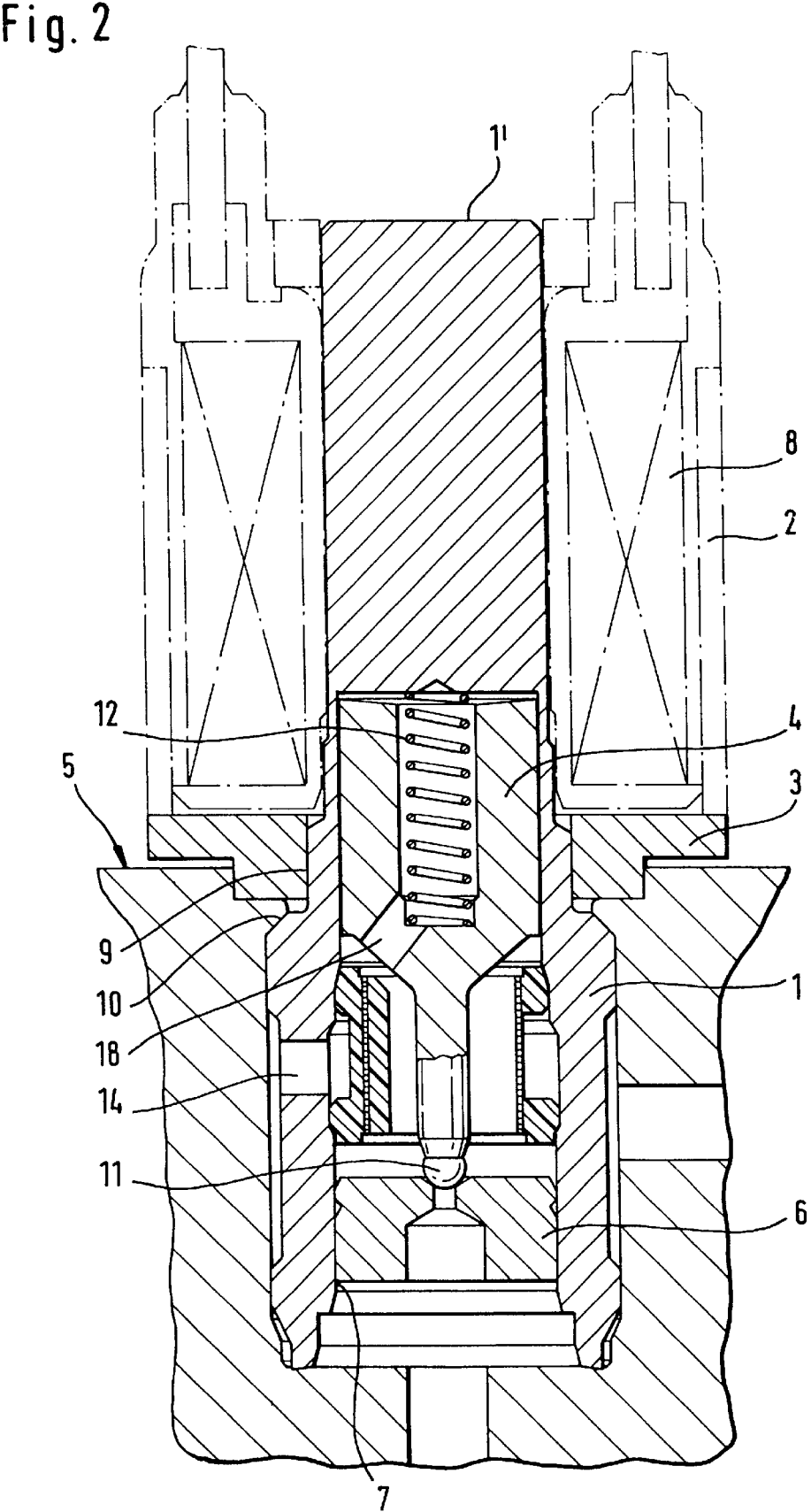
FIG. 2 is a closed electromagnetic valve which is not energized electromagnetically in its inactive position.

The electromagnetic valve of FIG. 2 shows in many detail features a structure which is comparable to that of FIG. 1 so that only the differences of the described electromagnetic valve in FIG. 2 will be referred to in the following. In the closed initial position of the electromagnetic valve shown in the drawing, the valve closure member 11 which is integral with the magnet armature 4 remains in position on the valve seat member 6 by the action of a compression spring 12. The valve housing 1 is connected integrally with the housing portion 1', which is configured as a solid cylinder core part, in such a way that a transition area with thinnest possible walls remains between the magnetic core part (housing portion 1') and the valve housing 1. With respect to its wall thickness, this transition area must be limited to a necessary amount of strength of the electromagnetic valve in order to minimize the magnetic losses in this area. To prevent the so-called sticking of the magnet armature after electromagnetic energization, the end surface of the magnet armature 4 remote from the valve closure member 11 has a concave configuration so that an armature end surface including an air slot is achieved without the need to insert a washer. A possible pressure fluid exchange between the area outside and inside the magnet armature 4 is conducted as centrally as possible by way of a pressure compensation bore 18. This obviates the need for a pressure compensation groove at the periphery of the magnet armature 4 which has previously been necessary and weakened the magnetic force. The movement of the magnet armature at low temperatures of the pressure fluid is greatly improved. The conical design of the armature end surface also favours the distribution of pressure fluid in the area of the magnet armature 4.

The electromagnetic valve closed in the initial position, as shown in FIG. 2, includes a particularly simple construction especially in terms of the bottle-shaped one-piece contour of the valve housing 1 with the housing portion 1'. By using ferromagnetic materials for the valve housing, none of the previously known anti-magnetic transition resistances are caused between the yoke ring 2 and the housing portion 1'. The magnet armature 4 is appropriately connected integrally with the valve closure member 11 which helps considerably to economize manufacturing costs and overall dimensions. Likewise, the electromagnetic valve of FIG. 2, due to the identity of elements referred to in the description of the electromagnetic valve of FIG. 1, can make use of the advantages of this valve. Among others, the advantages involve the relatively simple caulking of the valve housing 1 in the accommodating member 5 by way of the annular piece 3. The valve housing 1 is sealed in the bore of the accommodating member 5 by the biasing force of the annular piece 3 acting on the bottom edge of the housing, on the one hand, and by the deformation of the housing material of the accommodating bore 5 in the area of the chamfer 10.

With respect to the setting of the magnet armature stroke in the valve housing, it is only necessary to displace the valve seat member 6 in the opening 7 into the desired position and to fix it there. In this position, a rate of fluid volume representative of the desired magnet armature stroke adjustment is achieved for the pressure fluid volume which penetrates the electromagnetic valve under low pressure, with the valve seat member 6 initially open. The magnet armature 4 is energized electromagnetically during the stroke adjustment to bridge the effect of the compression spring 12.

List of Reference Numerals:
1 valve housing
1' housing portion
2 yoke ring
3 annular piece
4 magnet armature
5 accommodating member
6 valve seat member
7 plate valve
8 valve coil
9 stepped portion
10 chamfer
11 valve closure member
12 compression spring
13 annular filter
14 pressure fluid bore
15 plate filter
16 bypass channel
17 plate-type non-return valve
18 pressure compensation bore

What is claimed is:
1. Electromagnetic valve, comprising:
 a valve housing with a valve seat member and a valve closure member controlled by a magnet armature,
 a valve coil arranged around the magnet armature and delimited by a yoke ring,
 a housing portion which closes the valve housing and on which the magnet armature is supported, wherein the valve housing, the housing portion which closes the valve housing, the yoke ring and the magnet armature are made of a material which is magnetic-flux conductive, wherein the yoke ring bears against a ferromagnetic annular piece that is slipped from outwards on the valve housing on an outside surface of a ferromagnetic accommodating member which carries the valve housing, and a magnetic circuit including a stepped portion, wherein the stepped portion is arranged between the valve housing inserted into the accommodating member and the housing portion, and a cylindrical extension adjacent to the stepped portion the cylindrical extension being decreased in its outside diameter and extending into the valve coil to form the closed ferromagnetic housing portion, wherein the valve housing includes an opening at an end surface remote from the housing portion, which is conformed to the outside diameter of the valve seat member and in which the valve seat member is inserted without a clearance, the said opening being delimited by the bore bottom of the accommodating member.

2. Electromagnetic valve as claimed in claim 1, wherein the depth of the opening which is adapted to the nominal diameter of the valve seat member exceeds the size of the valve seat member.

3. Electromagnetic valve as claimed in claim 1, wherein the valve housing in the area of the accommodating member exhibits the contour of a hollow-cylindrical turned part which is open in the direction of the accommodating member and adjacent to which is the cylindrical extension which is decreased in its outside diameter to form the closed housing portion.

4. Electromagnetic valve as claimed in claim 1, wherein the housing portion is made of a ferromagnetic sleeve which is in particular formed into a dome and is deepdrawn from stainless steel.

5. Electromagnetic valve as claimed in claim 3, wherein the housing portion is attached to the extension of the valve housing in a welded or hard-soldered connection.

6. Electromagnetic valve as claimed in claim 3, wherein the housing portion is configured as a solid cylinder core part integrally with the valve housing, and a thin-walled transition area exists between the housing portion and the valve housing.

7. Electromagnetic valve as claimed in claim 1, wherein the stepped portion disposed between the housing portion and the valve housing accommodates the annular piece and has a chamfer and wherein a material volume of the accommodating member is displaced by way of the annular piece in the direction of the stepped portion onto the chamfer.

8. Electromagnetic valve as claimed in claim 1, wherein the end surface of the magnet armature remote from the valve closure member has a concave configuration.

* * * * *